S. SCHNEIDER.
ADJUSTABLE RETAINER FOR BALL BEARINGS.
APPLICATION FILED AUG. 3, 1910.
985,289.
Patented Feb. 28, 1911.
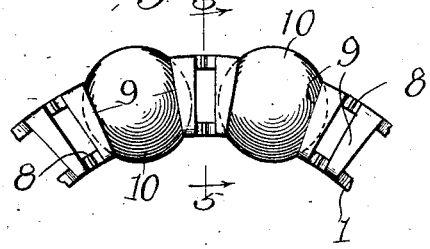
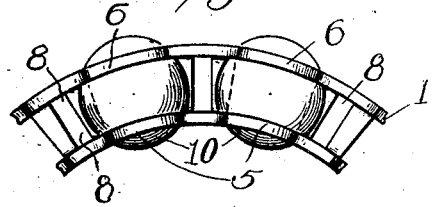
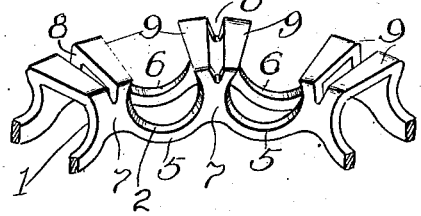
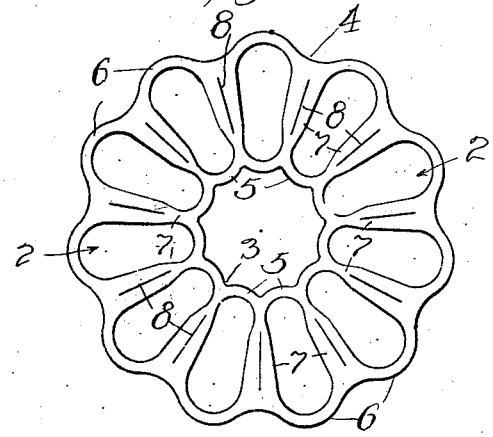
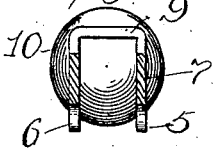
Witnesses:
H. R. L. White
R. G. White
Inventor:
Stefan Schneider
By Robert Klotz Atty

UNITED STATES PATENT OFFICE.

STEFAN SCHNEIDER, OF CHICAGO, ILLINOIS.

ADJUSTABLE RETAINER FOR BALL-BEARINGS.

985,289.

Specification of Letters Patent.  Patented Feb. 28, 1911.

Application filed August 3, 1910. Serial No. 575,259.

*To all whom it may concern:*

Be it known that I, STEFAN SCHNEIDER, a subject of the Emperor of Germany, and residing at Chicago, in the county of Cook and State of Illinois, have invented a new and useful Improvement in Adjustable Retainers for Ball-Bearings, of which the following is a complete specification.

The main objects of this invention are to provide a retainer for ball bearings which is capable of being adjusted to hold balls of different sizes; to provide a retainer which is so constructed that the balls may be easily inserted or removed without injury to the retainer; to provide a retainer which will produce but a minimum amount of friction on the balls; and to provide a retainer of very simple and light construction.

A specific construction embodying the invention is illustrated in the accompanying drawings, in which:

Figure 1 is an enlarged, fragmentary side elevation of one side of the retainer with balls carried therein. Fig. 2 is a similar view of the opposite side of the retainer. Fig. 3 is an enlarged, fragmentary perspective view of the retainer with the jaws spread or in locking position. Fig. 4 is a plan view of the blank for the retainer after it has been punched out before it has been formed. Fig. 5 is a section taken on line 5—5 of Fig. 1.

In the construction shown, the retainer 1 is formed from a blank of sheet metal which is first stamped or punched to provide a flat annular piece with radially disposed, elongated apertures therein which form the ball seats 2 in the completed retainer. The inner and outer edges 3 and 4 of the piece are scalloped out between the apertures, thereby leaving curved strips of metal 5 and 6 at the ends of the apertures which provide the bottoms of the ball seats. The apertures are rounded at their ends and their outer ends are larger than their inner ends. The apertures taper from their outer ends to a point near their inner ends, and the latter are enlarged to a greater width than the small part of the tapered portion. The portions 7 between the apertures are provided with longitudinal slits 8. The blank is then formed into an annular channel by bending the edges 3 and 4 in the same direction, as shown in Fig. 3. This brings the curved portions 5 and 6 into place to form the bottoms of the ball seats or apertures 2, while the portions 7 between said seats separate or space the balls the desired distance apart. The slits 8 divide the portions 7 into U-shaped locking jaws 9 which, when the balls 10 are placed in the seats, are adapted to be spread apart so as to cause them to partially close the ball seats and overlap the balls, as shown in Fig. 1, and thereby hold the balls in place.

The operation of the construction shown is as follows: The jaws 9 on each spacing portion 7 are normally close together so that the balls may pass between the portions 7 to enter the seats where they rest upon and between the curved portions 5 and 6. The jaws on each spacing portion are then spread apart thereby throwing one jaw of each pair over the adjacent ball and holding the ball in the retainer. The balls must be of sufficient diameter so that they will project through the ends of the seats and beyond the inner and outer sides of the retainer, but will not pass out of the retainer through said ends. Any size of ball which is small enough to pass into the seat before the jaws are spread and which is large enough to project from the sides of the retainer, may be used in the retainer. The jaws may always be spread far enough to bring them into relatively close proximity to the balls, whether the balls be large or small, thereby making the retainer adjustable to different sizes of balls. The retainer thus formed has only four points of contact on each ball, one on each curved portion 5—6 and one on each overlapping jaw. The friction of the balls in the retainer is therefore very small or of a nearly negligible quantity.

When it is desired to remove a ball from the retainer or insert a new ball in the retainer, it is only necessary to close the jaws adjacent to the particular seat to permit the ball to pass out or in. When the ball is in the seat the jaws may be again spread to lock the ball in place.

While I have herein shown and described but one specific embodiment of the invention it will be understood that various details of the construction shown may be varied or omitted without departing from the scope of the claims.

I claim:

1. A retainer for ball bearings, comprising an annular channel, seats in the sides of the channel, and a pair of jaws between adjacent seats and adapted, when spread, to hold the balls in place.

2. A retainer for ball bearings, comprising an annular channel, seats in the sides of the channel, and a pair of U shaped jaws between adjacent seats and adapted to overlap the balls in the seats.

3. An adjustable retainer for ball bearings, comprising an annular sheet metal channel, seats formed in the sides of the channel and opening through the bottom thereof, and U shaped jaws formed on the bottom of the channel and adapted to be adjusted to and from each other to retain varying sizes of balls in the seats.

In witness whereof I have hereunto subscribed my name in the presence of two witnesses.

STEFAN SCHNEIDER.

Witnesses:
W. W. WITHENBURY,
ERNST GRIFFEL.

Copies of this patent may be obtained for five cents each, by addressing the "Commissioner of Patents, Washington, D. C."